US011214895B2

(12) United States Patent
Hunt et al.

(10) Patent No.: US 11,214,895 B2
(45) Date of Patent: Jan. 4, 2022

(54) LOW PERMEABILITY AND HIGH STRENGTH FABRIC AND METHODS OF MAKING THE SAME

(71) Applicant: INV PERFORMANCE MATERIALS, LLC, Wilmington, DE (US)

(72) Inventors: Neil Hunt, Glouscester (GB); Varunesh Sharma, Johns Creek, GA (US)

(73) Assignee: INV PERFORMANCE MATERIALS, LLC, Wilmington, DE (US)

( * ) Notice: Subject to any disclaimer, the term of this patent is extended or adjusted under 35 U.S.C. 154(b) by 0 days.

(21) Appl. No.: 15/771,464

(22) PCT Filed: Nov. 4, 2016

(86) PCT No.: PCT/US2016/060436
§ 371 (c)(1),
(2) Date: Apr. 27, 2018

(87) PCT Pub. No.: WO2017/079499
PCT Pub. Date: May 11, 2017

(65) Prior Publication Data
US 2018/0327940 A1    Nov. 15, 2018

Related U.S. Application Data

(60) Provisional application No. 62/251,817, filed on Nov. 6, 2015.

(51) Int. Cl.
| | |
|---|---|
| *D03D 1/02* | (2006.01) |
| *D03D 13/00* | (2006.01) |
| *D03D 15/00* | (2021.01) |
| *B60R 21/235* | (2006.01) |
| *D03D 15/46* | (2021.01) |

(52) U.S. Cl.
CPC .............. *D03D 1/02* (2013.01); *D03D 13/008* (2013.01); *D03D 15/46* (2021.01); *B60R 21/235* (2013.01); *B60R 2021/23509* (2013.01); *B60R 2021/23542* (2013.01); *D10B 2401/041* (2013.01); *D10B 2505/124* (2013.01); *D10B 2505/18* (2013.01)

(58) Field of Classification Search
CPC ............ A61K 31/4709; C07D 215/227; C07D 401/12; C07D 405/12; C07D 409/12; C07D 471/04; B60R 2021/23509; B60R 2021/23542; B60R 21/235; D03D 13/008; D03D 15/0088; D03D 1/02; D10B 2401/041; D10B 2505/124; D10B 2505/18

See application file for complete search history.

(56) References Cited

U.S. PATENT DOCUMENTS

| | | | |
|---|---|---|---|
| 2,824,034 | A | 2/1958 | Worby |
| 4,442,162 | A | 4/1984 | Kuester |
| 4,921,735 | A | 5/1990 | Bloch |
| 4,977,016 | A | 12/1990 | Thornton et al. |
| 5,073,418 | A | 12/1991 | Thornton et al. |
| 5,076,975 | A | 12/1991 | Davis |
| 5,110,666 | A | 5/1992 | Menzel et al. |
| 5,370,925 | A | 12/1994 | Tomohiro |
| 5,441,798 | A | 8/1995 | Nishimura et al. |
| 5,540,965 | A | 7/1996 | Nishimura et al. |
| 5,763,330 | A | 6/1998 | Bertolucci et al. |
| 5,782,489 | A | 7/1998 | LaLonde |
| 5,826,905 | A | 10/1998 | Tochacek et al. |
| 5,863,644 | A | 1/1999 | Bonigk et al. |
| 5,879,767 | A | 3/1999 | Matsushima et al. |
| 5,897,929 | A | 4/1999 | Li et al. |
| 5,928,721 | A | 7/1999 | Parker et al. |
| 5,994,243 | A | 11/1999 | Bowen et al. |
| 6,024,380 | A | 2/2000 | Kim et al. |
| 6,291,040 | B1 | 9/2001 | Moriwaki et al. |
| 6,344,251 | B1 | 2/2002 | Keshavaraj et al. |
| 6,399,155 | B2 | 6/2002 | Child et al. |
| 6,458,725 | B1 | 10/2002 | Masuda et al. |
| 6,488,311 | B2 | 12/2002 | Kato et al. |
| 6,520,539 | B1 | 2/2003 | Ritter et al. |
| 6,576,574 | B2 | 6/2003 | Child et al. |
| 6,598,902 | B2 | 7/2003 | Keshavaraj |
| 6,601,614 | B1 | 8/2003 | Ishii |

(Continued)

FOREIGN PATENT DOCUMENTS

| | | |
|---|---|---|
| CA | 2014249 C | 5/1997 |
| CA | 2507457 C | 8/2009 |

(Continued)

OTHER PUBLICATIONS

US 9,085,839 B2, 07/2015, Fink (withdrawn)
https://patents.google.com/patent/DE4009611A1/en?oq= DE4009611A1 (Year: 1990).*
International Search Report and Written Opinion received for PCT application No. PCT/US2018/029504, dated Jul. 27, 2018, 14 pages.
International Search Report and Written Opinion received for PCT application No. PCT/US18/53009, dated Dec. 3, 2018, 9 pages.
International Preliminary Report on Patentability Report Received for PCT Patent Application No. PCTUS2015/017646, dated Aug. 30, 2016, 12 pages.

(Continued)

*Primary Examiner* — Arti Singh-Pandey (57) ABSTRACT

An uncoated woven fabric of yarn formed from synthetic fibers woven in the warp direction and weft direction to form a top surface and a bottom surface wherein at least a portion of the yarn on the top surface or at least a portion of the yarn on the bottom surface has fibers with a permanently modified cross-section and that are fused together is provided. Methods for production and use of this fabric in application to products such as automobile airbags, sailcloths, inflatable slides, temporary shelters, tents, ducts, coverings and printed media are also provided.

12 Claims, 7 Drawing Sheets

(56) References Cited

U.S. PATENT DOCUMENTS

| | | |
|---|---|---|
| 6,607,797 B1 | 8/2003 | Ritter |
| 6,630,220 B1 | 10/2003 | Veiga |
| 6,632,754 B1 | 10/2003 | Rose |
| 6,659,501 B2 | 12/2003 | Rychter |
| 6,685,220 B2 | 2/2004 | Ohhashi et al. |
| 6,698,790 B2 | 3/2004 | Iseki et al. |
| 6,749,220 B1 | 6/2004 | Wipasuramonton et al. |
| 6,770,578 B2 | 8/2004 | Veiga |
| 6,886,857 B1 | 5/2005 | Mishina et al. |
| RE38,769 E | 8/2005 | Keshavaraj et al. |
| 6,971,674 B2 | 12/2005 | Johansson |
| 7,468,334 B2 | 12/2008 | Schindzielorz |
| 7,501,359 B2 | 3/2009 | Li |
| 7,514,030 B2 | 4/2009 | Nilsson et al. |
| 7,681,917 B2 | 3/2010 | Guillo et al. |
| 7,780,194 B2 | 8/2010 | Trondle et al. |
| 8,007,630 B1 | 8/2011 | Keshavaraj et al. |
| 8,132,826 B2 | 3/2012 | Schindzielorz |
| 8,267,423 B2 | 9/2012 | Wipasuramonton et al. |
| 8,287,685 B2 | 10/2012 | Be et al. |
| 8,333,220 B2 | 12/2012 | King |
| 8,361,582 B2 | 1/2013 | Jarvis et al. |
| 8,376,401 B2 | 2/2013 | Wipasuramonton et al. |
| 8,408,597 B2 | 4/2013 | Teshima et al. |
| 8,431,647 B2 | 4/2013 | Dumont et al. |
| 8,485,550 B2 | 7/2013 | Kino et al. |
| 8,733,788 B2 | 5/2014 | Finn et al. |
| 8,778,130 B2 | 7/2014 | Schindzielorz |
| 8,960,714 B2 | 2/2015 | Kim et al. |
| 9,067,564 B2 | 6/2015 | Kemp et al. |
| 9,079,558 B2 | 7/2015 | Crouch |
| 9,085,834 B2 | 7/2015 | Huber |
| 9,284,667 B2 | 3/2016 | Pai |
| 9,469,268 B2 | 10/2016 | Sugimoto |
| 9,815,430 B2 | 11/2017 | Tanaka |
| 9,822,471 B2 | 11/2017 | Ise |
| 9,868,413 B2 | 1/2018 | Ise |
| 9,896,787 B2 | 2/2018 | Kim et al. |
| 10,259,421 B2 | 4/2019 | Ise |
| 2002/0017779 A1 | 2/2002 | Gilpatrick et al. |
| 2002/0140218 A1 | 10/2002 | Beasley |
| 2002/0195808 A1 | 12/2002 | Chiou et al. |
| 2004/0014386 A1 | 1/2004 | Soelch et al. |
| 2004/0029468 A1 | 2/2004 | Kim et al. |
| 2004/0171325 A1 | 9/2004 | Woods |
| 2005/0181168 A1 | 8/2005 | Barnes et al. |
| 2006/0151882 A1 | 7/2006 | Trondle et al. |
| 2006/0163853 A1 | 7/2006 | Keshavaraj et al. |
| 2006/0192372 A1 | 8/2006 | Khouri et al. |
| 2006/0192373 A1 | 8/2006 | Manley |
| 2006/0237957 A1 | 10/2006 | Woydick |
| 2006/0252322 A1* | 11/2006 | DeBenedictis et al. .. B32B 5/02 442/59 |
| 2007/0007756 A1 | 1/2007 | Okuno et al. |
| 2007/0031621 A1 | 2/2007 | Morimoto et al. |
| 2009/0020213 A1 | 1/2009 | Iwata et al. |
| 2009/0058051 A1 | 3/2009 | Hatfield et al. |
| 2009/0247030 A1 | 10/2009 | Kano et al. |
| 2009/0297723 A1 | 12/2009 | Keshavaraj et al. |
| 2010/0109305 A1 | 5/2010 | Miyata |
| 2010/0159189 A1 | 6/2010 | Takagi et al. |
| 2010/0260976 A1 | 10/2010 | Kano et al. |
| 2011/0076479 A1 | 3/2011 | Danielson et al. |
| 2012/0205901 A1 | 8/2012 | Westoby |
| 2013/0026740 A1 | 1/2013 | Finn et al. |
| 2013/0033027 A1* | 2/2013 | Kim ...................... B60R 21/235 280/743.1 |
| 2013/0035014 A1 | 2/2013 | Tone et al. |
| 2013/0189887 A1 | 7/2013 | Akechi et al. |
| 2014/0272271 A1 | 9/2014 | Tam et al. |
| 2015/0167207 A1 | 6/2015 | Bongartz et al. |
| 2015/0246655 A1 | 9/2015 | Furuniwa et al. |
| 2015/0329998 A1 | 11/2015 | Ise |
| 2015/0368834 A1 | 12/2015 | Ise |
| 2016/0130748 A1 | 5/2016 | Veiga |
| 2017/0067189 A1* | 3/2017 | Yokoi ...................... D03D 1/02 |
| 2017/0073856 A1* | 3/2017 | Myers ...................... D03D 1/02 |
| 2017/0080678 A1 | 3/2017 | Bhatnagar et al. |
| 2018/0327940 A1 | 11/2018 | Hunt et al. |

FOREIGN PATENT DOCUMENTS

| | | |
|---|---|---|
| CN | 1155597 A | 7/1997 |
| CN | 1771153 A | 5/2006 |
| CN | 101356081 A | 1/2009 |
| CN | 101033569 B | 12/2010 |
| CN | 102220685 A | 10/2011 |
| CN | 1449338 B | 6/2012 |
| CN | 102859056 A | 1/2013 |
| CN | 103173908 A | 6/2013 |
| CN | 103726168 A | 4/2014 |
| CN | 104520481 A | 4/2015 |
| CN | 105256597 A | 1/2016 |
| CN | 105568704 B | 11/2017 |
| DE | 2150481 A1 | 4/1973 |
| DE | 4009611 | 10/1991 |
| DE | 4009611 A1 | 10/1991 |
| DE | 4206997 A1 | 9/1993 |
| DE | 19852232 A1 | 5/2000 |
| DE | 10202715 A1 | 12/2002 |
| DE | 10153243 B4 | 11/2008 |
| DE | 102012019945 A1 | 4/2013 |
| DE | 102012008481 A1 | 10/2013 |
| DE | 102017003568 A1 | 1/2018 |
| EP | 0768405 A1 | 4/1997 |
| EP | 0611683 B1 | 8/1997 |
| EP | 0656842 B1 | 12/1998 |
| EP | 0896562 A1 | 2/1999 |
| EP | 0682136 B1 | 7/1999 |
| EP | 0962363 A1 | 12/1999 |
| EP | 0963468 A1 | 12/1999 |
| EP | 0747518 B1 | 5/2002 |
| EP | 0624210 B1 | 6/2002 |
| EP | 1255892 B1 | 7/2004 |
| EP | 0416483 B2 | 9/2004 |
| EP | 0930988 B1 | 6/2005 |
| EP | 1475475 B1 | 6/2008 |
| EP | 2199062 A1 | 6/2010 |
| EP | 2202120 A1 | 6/2010 |
| EP | 2221405 A1 | 8/2010 |
| EP | 2586664 A1 | 5/2013 |
| EP | 1963143 B1 | 11/2013 |
| FR | 941030 A | 12/1948 |
| GN | 103403240 B | 3/2016 |
| JP | H08176932 A | 7/1996 |
| JP | H09143835 A | 6/1997 |
| JP | 02-705307 B2 | 1/1998 |
| JP | H10-076895 A | 3/1998 |
| JP | 10-102029 A | 4/1998 |
| JP | 10-266040 A | 10/1998 |
| JP | 02-935939 B2 | 8/1999 |
| JP | 03-036215 B2 | 4/2000 |
| JP | 03-147239 B2 | 3/2001 |
| JP | 2001-507759 A | 6/2001 |
| JP | 2002-266195 A | 9/2002 |
| JP | 03-457739 B2 | 10/2003 |
| JP | 2003-293241 A | 10/2003 |
| JP | 2004-156166 A | 6/2004 |
| JP | 2004-176221 A | 6/2004 |
| JP | H03-536552 B2 | 6/2004 |
| JP | 2004-339640 A | 12/2004 |
| JP | 03-720895 B2 | 11/2005 |
| JP | 2006-027373 A | 2/2006 |
| JP | 3-873243 B2 | 1/2007 |
| JP | 03-983096 B2 | 9/2007 |
| JP | 2009-062643 A | 3/2009 |
| JP | 2009-227017 A | 10/2009 |
| JP | 2010-018901 A | 1/2010 |
| JP | 2010-032718 A | 2/2010 |
| JP | 2011503374 A | 1/2011 |
| JP | 2011-152880 A | 8/2011 |
| JP | 2011-168131 A | 9/2011 |
| JP | 04-848658 B2 | 12/2011 |
| JP | 2013-078977 A | 5/2013 |

(56) References Cited

FOREIGN PATENT DOCUMENTS

| JP | 05-318659 | B2 | 10/2013 | |
|---|---|---|---|---|
| JP | 05-706924 | B2 | 4/2015 | |
| JP | 2015-104998 | A | 6/2015 | |
| JP | 2017-036530 | A | 2/2017 | |
| JP | 2017-065507 | A | 4/2017 | |
| JP | 2017-105350 | A | 6/2017 | |
| KR | 100504301 | B1 | 7/2005 | |
| KR | 10-2011-0001498 | A | 1/2011 | |
| KR | 10-2011-0035271 | A | 4/2011 | |
| KR | 10-1103802 | B1 | 1/2012 | |
| KR | 10-1590152 | B1 | 1/2016 | |
| KR | 10-1621078 | B1 | 5/2016 | |
| KR | 10-2016-149797 | A | 12/2016 | |
| KR | 10-2017-0079655 | A | 7/2017 | |
| KR | 10-2018-0036313 | A | 4/2018 | |
| KR | 10-2018-0072332 | A | 6/2018 | |
| KR | 10-1864888 | B1 | 6/2018 | |
| WO | 1998/012075 | A1 | 3/1998 | |
| WO | 2003/053678 | A1 | 7/2003 | |
| WO | 2012026455 | A1 | 3/2012 | |
| WO | 2014/017967 | A1 | 1/2014 | |
| WO | 2014/104240 | A1 | 7/2014 | |
| WO | 2015/130882 | A1 | 9/2015 | |
| WO | WO-2015130882 | A1 * | 9/2015 | ........... B60R 21/235 |
| WO | WO-2015137495 | A1 * | 9/2015 | |
| WO | 2017/079499 | A1 | 5/2017 | |
| WO | 2017/169388 | A1 | 10/2017 | |
| WO | 2017/176892 | A1 | 10/2017 | |
| WO | 2018/204154 | A1 | 8/2018 | |
| WO | 2019/067655 | A1 | 4/2019 | |

OTHER PUBLICATIONS

International Search Report and Written Opinion Received for PCT Application No. PCT/US2015/017646, dated May 28, 2015, 14 pages.
Barnes, et al., "Experimental Determination of the Heat Resistive Properties of Airbag Fabrics" Proc. 8th World Textile Congress, Industrial, Technical and High Performance Textiles, University of Huddersfield, Jul. 15-16, 1998, pp. 329-338.
International Search Report and Written Opinion for International Applicatio No. PCT/US2018/053009, dated Dec. 3, 2018, 8 pages.
Notification of Reasons for Refusal received for JP application No. 2018-543047, dated Oct. 13, 2020, 10 pages. (5 pages of English translation and 5 pages of official copy).
International Search Report and Written Opinion Received for PCT Patent Application No. PCT/US2016/060436, dated Feb. 6, 2017, 11 Pages.
International Preliminary Report on Patentability Received for PCT Patent Application No. PCT/US2016/060436, dated May 17, 2018, 9 Pages.

* cited by examiner

Figure 1

Nylon66 Fabric Top surface before HTHP treatment

A

Nylon66 Fabric Top surface after HTHP treatment with direct heat

B

Nylon66 Fabric Bottom surface before HTHP treatment

C

Nylon66 Fabric Bottom surface after HTHP treatment with no direct heat

Nylon66 Fabric Top surface after HTHP treatment with direct heat

A B

Nylon66 Fabric Cross Section after HTHP treatment with direct heat on upper surface

C

Nylon66 Fabric Bottom surface after HTHP treatment with no direct heat

Nylon66 Fabric after HTHP treatment and subsequent Heat Ageing

Nylon66 Fabric after HTHP treatment and subsequent Heat & Humidity Ageing

Figure 4

Nylon66 Fabric after HTHP treatment

Nylon66 Fabric after HTHP treatment and Subsequent Boiling in Water

Figure 5

Nylon66 Fabric after HTHP treatment with direct heat on both surfaces

PET Fabric after HTHP treatment with direct heat on both surfaces

Figure 6

Nylon66 Fabric after HTHP treatment at 5mpm speed

Nylon66 Fabric after HTHP treatment at 15mpm speed

Figure 7

Nylon66 OPW Fabric after HTHP treatment

LOW PERMEABILITY AND HIGH STRENGTH FABRIC AND METHODS OF MAKING THE SAME

FIELD OF THE INVENTION

The invention relates to uncoated woven fabric of yarns of synthetic fibers and methods for production and use of such fabric to produce products such as, but not limited to, airbags, sailcloth, inflatable slides, tents, ducts, coverings and printed media.

BACKGROUND OF THE INVENTION

Fabrics and textiles with high tensile strength have many industrial applications. In order to be useful, many industrial applications require fabrics to meet a number of requirements. These can include tensile strength, air permeability, surface finish, stiffness and packability. Examples of these applications include airbags, sailcloth, inflatable slides, tents, ducts, coverings and printed media.

Inflatable airbags are a key component of vehicle safety systems. As used herein, "air bag" means inflatable passive safety restraints for automobiles and many other forms of transportation, including military and aviation applications. Air bags are one form of inflatable passive safety restraint devices that are now standard in automotive use. In recent years, the number of airbags, and the area of coverage for these airbags within various types of vehicular cabins has increased. Multiple air bag configurations in use include air bags for the front seating area, for side impact protection, for rear seat use, for use in headliner area inflatable curtains, and for use in inflatable seat belts or pedestrian airbags.

To meet the requirements for effective inflation, airbag fabric must meet certain tensile strength requirements and have the ability to resist the passage of air, which is defined by measures of air permeability. Therefore, it is desirable for woven nylon or polyester airbags to have a very low porosity and correspondingly low air permeability. While fabric properties, such as the linear density of the yarns, twist factors, weave construction and thickness and weight, all influence air permeability, it has often been necessary to add a coating or additional layer to airbag fabrics to meet industry standards.

Creating an air- and liquid-impervious structure has traditionally been achieved using various forms of coated fabrics from processes such as gravure coating, immersion, knife-over-roll coating, curtain coating, knife over air coating, reverse roll, rotary screen, transfer, extrusion, hot melt, lamination, impregnation and metering rod. All of the resulting structures add significant cost to base fabric.

Polyester and polyamide fabrics having various coatings to reduce permeability are known, U.S. Pat. No. 5,897,929 describes a polyester or polyamide fabric coated with a porosity-blocking layer of polyamide material. U.S. Pat. No. 5,110,666 describes a fabric substrate that is often coated with a polycarbonate-polyether polyurethane which provides certain permeability, flexibility, toughness, and thermal resistance benefits. U.S. Pat. No. 5,076,975 describes a molding operation for forming an elastomer-coated fabric having a defined shape. U.S. Pat. No. 5,763,330 describes a method for extrusion coating a polyethylene resin onto a nylon fabric. The woven fabrics from which air bags are traditionally manufactured may also be coated with elastic materials, notably silicone rubber, to manage the air permeability of the fabric.

However, not only is the coating process slow and laborious process, but the coatings themselves are expensive, thus making these airbags very costly. Further, coatings can hinder the foldability of these fabrics, a necessary characteristic for airbags.

As a result, alternatives to coatings for airbag fabrics have been sought. For example, there have been attempts in the past to create low permeability structures that require a reduced amount or no coating that have relied on the shrinkage of the yarn alone, to create a necessarily dense structure. For example, U.S. Pat. Nos. 4,921,735 and 5,540,965 teach shrinking and then heat setting fabrics to improve air impermeability. U.S. Pat. No. RE38,769 E1 also discuss compressing the fabric with the help of an extensible belt and heated roll, but then allowing the fabric to recoil so fabric foldability is improved, while air permeability is not adversely affected.

U.S. Pat. No. 5,073,418, Canadian Pat. No. 2014249C and Chinese Pat. No. CN 101033569B describe calendering an airbag fabric below its softening temperature on both sides to produce a non-permanent, low permeability structure as a result of pressing down the fabric high spots. The permeability drop observed is disclosed as being non-permanent for nylon 6,6 fabrics due to moisture regain.

U.S. Patent Application No. 2013/0035014 discloses a fabric that can maintain low air permeability after the fabric is washed. The high-density fabric includes a synthetic fiber that has a fineness of 28 dtex or less, and a total cover factor ranging from 1700 to 2200. Disclosed uses for this fabric include a side cloth of a down wear, a down jacket, a futon (i.e., Japanese bedding), and a sleeping bag.

WIPO Application No, 2015130882 discloses a woven fabric for use in airbags comprising a base yarn and a secondary yarn, wherein the secondary yarn is interwoven into the base yarn, and wherein the secondary yarn has a melting point that is lower than the melting point of base yarn. Also disclosed is a method of making a base yarn and a secondary yarn, wherein the secondary yarn is interwoven into the base yarn, and wherein the secondary yarn has a melting point that is lower than the melting point of the base yarn.

There is a need in the art for additional high strength, foldable fabrics that require a reduced amount of coating or no coating at all, and which still meet critical performance standards, such as permanent low air permeability and high tensile strength.

SUMMARY OF THE INVENTION

The present invention relates to uncoated woven fabrics comprising yarns of synthetic fibers, and methods for production and uses of such fabrics.

An aspect of the present invention relates to uncoated woven fabric comprising yarn formed from synthetic fibers woven in the warp direction and weft direction to form a top surface and a bottom surface. In fabric of the present disclosure, at least a portion of the yarn on the top surface or at least a portion of the yarn on the bottom surface have fibers with a permanently modified cross-section and that are fused together. In one nonlimiting embodiment of the present invention, the fabric has a static air permeability (SAP) of 3 l/dm$^2$/min or lower when the fabric is unaged, a dynamic air permeability (DAP) of 500 mm/s or lower when the fabric is unaged, and the tensile strength of the fabric in both the warp and weft directions is 1000 N or greater when the fabric is unaged.

Another aspect of the present invention relates to an article formed from the uncoated woven fabric. Examples of articles include, but are not limited to, products such as airbags, sailcloth, inflatable slides, tents, ducts, coverings and printed media.

Another aspect of the present invention relates to an airbag formed from the uncoated woven fabric.

Another aspect of the present invention relates to a method of forming an uncoated woven fabric. This method of the present invention comprises weaving yarn formed from synthetic fibers in the warp direction and weft direction to form a fabric with a top surface and a bottom surface. The fabric is then treated in order to permanently modify the cross-section and fuse at least a portion of the fibers in the yarn on the top surface or at least a portion of the fibers in the yarn on the bottom surface. In one nonlimiting embodiment, the fiber formed has a static air permeability (SAP) of 3 l/dm$^2$/min or lower when the fabric is unaged, the fabric formed has a dynamic air permeability (DAP) of 500 mm/s or lower when the fabric is unaged, and the tensile strength of the formed fabric in both the warp and weft directions is 1000 N or greater when the fabric is unaged.

Another aspect of the present invention relates to an article formed from the fabric formed in this method. Examples of articles include but are not limited to products such as airbags, sailcloth, inflatable slides, tents, ducts, coverings and printed media.

Yet another aspect of the present invention relates to an airbag formed from the fabric formed in this method.

BRIEF DESCRIPTION OF THE DRAWINGS

The accompanying drawings illustrate exemplary embodiments of the present disclosure, and together with the general description given above and the detailed description given below, serve to explain, by way of example, principles of the present disclosure.

FIGS. 7A through 7F are SEM images showing the effects of HTHP treatment of a one piece woven (OPW) fabric. The fabric was prepared from a nylon 6,6 350 dtx, 136 fil, high tenacity fiber. The OPW fabric was HTHP treated on both sides.

DETAILED DESCRIPTION OF THE INVENTION

The present invention relates to uncoated woven fabrics comprising yarns of synthetic fibers, and methods for production and uses of such fabrics. The uncoated fabrics of the present invention have reduced air permeability and porosity when compared to conventional uncoated fabrics formed from the same synthetic fibers at the same fabric construction.

An aspect of the present invention relates to uncoated woven fabric comprising yarn formed from synthetic fibers woven in the warp direction and weft direction to form a top surface and a bottom surface. In fabric of the present disclosure, at least a portion of the yarn on the top surface or at least a portion of the yarn on the bottom surface have fibers with a permanently modified cross-section and that are fused together. In one nonlimiting embodiment at least a portion of the yarn on the top surface and at least a portion of the yarn on the bottom surface have fibers with a permanently modified cross-section and that are fused together. In another embodiment of the current invention, a majority of the yarn on the top surface or a majority of the yarn on the bottom surface have fibers with a permanently modified cross-section and that are fused together. In yet another nonlimiting embodiment of the current invention, a majority of the yarn on the top surface and a majority of the yarn on the bottom surface have fibers with a permanently modified cross-section and that are fused together.

In one nonlimiting embodiment of the present invention, the fabric has a static air permeability (SAP) of 3 l/dm$^2$/min or lower when the fabric is unaged, a dynamic air permeability (DAP) of 500 mm/s or lower when the fabric is unaged, and the tensile strength of the fabric in both the warp and weft directions is 1000 N or greater when the fabric is unaged.

In one embodiment of the current invention, a majority of the yarn on the top surface or a majority of the yarn on the bottom surface have fibers with a permanently modified cross-section and that are fused together.

The term "permanently modified cross-section," as used herein, refers to a fiber cross section that is a modified or compressed version of the cross section of the majority of the fiber used in the fabric. The fiber may have any cross-section known in the art, including but not limited to circular, multi-lobal, tri-lobal, hexalobal or rectangular. In one non-limiting embodiment, the fiber has a circular cross-section. In one non-limiting embodiment, the permanently modified cross-section results in at least a portion of the fiber being substantially flat. See FIGS. 1A through 7F.

The term "permanent" or "permanently", as used herein, means the modified cross-section does not revert to its original shape. This is exemplified by the age testing depicted in FIGS. 3A through 3D and FIGS. 4A through 4F.

The term "High Temperature-High Pressure (HTHP)" treated as used herein, refer to treating the fabric at a selected temperature and/or selected pressure so that at least a portion of the yarn on the top surface or at least a portion of the yarn on the bottom surface of the woven fabric have fibers with a permanently modified cross-section and that are fused together so that air permeability and porosity of the fabric is reduced when compared to woven fabrics formed from the same synthetic fibers without thermo-processing. In one non-limiting embodiment, the fibers have a permanently modified cross-section that results in at least a portion of the fiber being substantially flat. See, for example FIGS. 5A through 5F. It had previously been believed that HTHP treatment of a fabric, for example by calendering a fabric at elevated temperatures close to the melting point of the yarn, would result in thermally induced mechanical degradation of the fabric, a decrease in fabric tensile and tear strength, a resultant poor dimensional stability and a significant increase in stiffness. For example, previous attempts with high temperature and high pressure calendering of woven fabrics led to a paper-like stiff product and did not result in desirable fabric properties for use in applications such as airbag fabrics. The inventors have unexpectedly discovered that by carrying out HTHP treatment under specific conditions, only a portion of the yarns on the top and/or bottom of the fabric can achieve a permanently modified cross-section of those yarns. Without being bound by any particular theory, it is believed that this permanently modified cross-section and fusing of a portion of the yarns results in a permanent reduction in air permeability while maintaining good packability and a high tensile strength of the fabric.

In one nonlimiting embodiment, a majority of the yarn used in the warp direction of fabric is formed from a synthetic fiber made from a single polymer. In another nonlimiting embodiment, a majority of the yarn used in the weft direction of fabric is formed from a synthetic fiber made from a single polymer. In another nonlimiting embodiment, a majority of the yarn used in the warp direction and weft direction of fabric is formed from synthetic fiber formed from a single polymer. In one nonlimiting embodiment, all of the yarn used in the warp direction of fabric is formed from a synthetic fiber made from a single polymer. In another nonlimiting embodiment, all of the yarn used in the weft direction of fabric is formed from a synthetic fiber made from a single polymer. In another nonlimiting embodiment, all of the yarn used in the warp direction and weft direction of fabric is formed from synthetic fiber formed from a single polymer.

Examples of synthetic fibers used in the present invention include, but are not limited to, polyamides, polyesters, polyolefins and blends or copolymers thereof.

Suitable polyamide fibers have a linear mass density in the range from 100 to 2000 decitex, such as from 200 to 950 decitex, from 150 to 750 decitex, from 200 to 900 decitex, from 250 to 850 decitex, from 300 to 850 decitex, from 350 to 850 decitex, from 400 to 850 decitex, from 400 to 800 decitex and from 450 to 800 decitex. Suitable polyamide fibers include those formed from nylon 6,6, nylon 6, nylon 6,12, nylon 7, nylon 12, nylon 4,6 or copolymers or blends thereof. In one nonlimiting embodiment of the present invention, the base yarn is formed from a nylon 6,6 fiber.

Suitable polyester fibers have a linear mass density in the range of 100 to 950 decitex, such as from 150 to 750 decitex, from 300 to 900 decitex, from 300 to 850 decitex, from 350 to 850 decitex, from 400 to 850 decitex, from 400 to 800 decitex, from 450 to 800 decitex, and from 500 to 800 decitex. Suitable polyester fibers include those formed from polyethylene terephthalate (PET), polybutylene terephthalate, polyethylene naphthalate, polybutylene naphthalate, polyethylene-1,2-bis(phenoxy)ethane-4,4'-dicarboxylate, poly(1,4cyclohexylene-dimethylene terephthalate and copolymers comprising at least one type of recurring units of the above-mentioned polymers, for example, polyethylene terephthalate/isophthalate copolyesters, polybutylene terephthalate/naphthalate copolyesters, polybutylene terephthalate/decanedicarboxylate copolyesters, or copolymers or blends thereof. In one nonlimiting embodiment of the present invention, the base yarn is formed from a PET fiber.

The fiber used in the present invention may also comprise various additives used in the production and processing of fibers. Suitable additives include, but are not limited to a thermal stabilizer, antioxidant, photo stabilizer, smoothing agent, antistatic agent, plasticizer, thickening agent, pigment, flame retarder, filler, binder, fixing agent, softening agent or combinations thereof.

In one nonlimiting embodiment, the fibers have a linear density in the range from about 1 to about 25 decitex per filament (DPF). In another nonlimiting embodiment, the fibers have a linear density in the range from about 2 to about 12 decitex per filament (DPF).

The woven fabric of the present invention may be formed from warp and weft yarns using weaving techniques known in the art. Suitable weaving techniques include, but are not limited to a plain weave, twill weave, satin weave, modified weaves of these types, one piece woven (OPW) weave, or a multi-axial weave. Suitable looms that can be used for weaving include a water jet loom, air jet loom or rapier loom. These looms can also be used in conjunction with a jacquard in order to create an OPW structure. Suitable woven fabrics of the present invention may have a total base weight in the range of 80 to 4500 grams per square meter. In certain embodiments, the total base weight of the woven fabric can range from 100 to 4500 grams per square meter, from 100 to 4000 grams per square meter, from 100 to 3500 grams per square meter, from 150 to 4500 grams per square meter, from 150 to 4000 grams per square meter, from 150 to 3500 grams per square meter, from 200 to 4500 grams per square meter, from 200 to 4000 grams per square meter, from to 200 to 3500 grams per square meter, from 250 to 4500 grams per square meter, from to 250 to 4000 grams per square meter, and from 250 to 3500 grams per square meter.

In one nonlimiting embodiment of the present invention, the woven fabric has a static air permeability (SAP) of 3 l/dm$^2$/min or lower when the fabric is unaged. In one nonlimiting embodiment of the present invention, the woven fabric has a SAP of 2 l/dm$^2$/min or lower when the fabric is unaged. In one nonlimiting embodiment of the present invention, the woven fabric has a SAP of 1 l/dm$^2$/min or lower when tested at 500 Pa when the fabric is unaged. In one nonlimiting embodiment of the present invention, the woven fabric has a SAP of 3 l/dm$^2$/min or lower after the fabric was heat aged at 105° C. for 408 hours and humidity aged at 70° C. and 95% relative humidity for 408 hours. In another nonlimiting embodiment of the present invention, the woven fabric has a SAP of 3 l/dm$^2$/min or lower after the fabric was aged at room temperature (20±5° C.) for 6 months. In another nonlimiting embodiment of the present invention, the woven fabric has a DAP of 500 mm/s or lower after the fabric was aged at room temperature (20±5° C.) for 6 months.

In one nonlimiting embodiment of the present invention, the woven fabric has a dynamic air permeability (DAP) of 500 mm/s or lower when the fabric is unaged. In one nonlimiting embodiment of the present invention, the woven fabric has a DAP of 400 mm/s or lower when the fabric is unaged. In one nonlimiting embodiment of the present invention, the woven fabric has a DAP of 300 mm/s or lower when the fabric is unaged. In one nonlimiting embodiment of the present invention, the woven fabric has a DAP of 200 mm/s or lower when the fabric is unaged. In one nonlimiting embodiment of the present invention, the woven fabric has a DAP of 100 mm/s or lower when the fabric is unaged. In one nonlimiting embodiment of the present invention, the woven fabric has a DAP of 500 mm/s or lower the fabric was heat aged at 105° C. for 408 hours and humidity aged at 70° C. and 95% relative humidity for 408 hours.

In one nonlimiting embodiment of the present invention, the woven fabric has a tensile strength of the fabric in both the warp and weft directions of 1000 N or greater when the fabric is unaged. In another nonlimiting embodiment of the present invention, the woven fabric has a tensile strength of the fabric in both the warp and weft directions of 1500 N or greater when the fabric is unaged. In another nonlimiting embodiment of the present invention, the woven fabric has a tensile strength of the fabric in both the warp and weft directions of 2000 N or greater when the fabric is unaged. In one nonlimiting embodiment of the present invention, the woven fabric has a tensile strength of the fabric in both the warp and weft directions of 2500 N or greater when the fabric is unaged. In yet another nonlimiting embodiment of the present invention, the woven fabric has a tensile strength of the fabric in both the warp and weft directions of 3000 N or greater when the fabric is unaged.

In one nonlimiting embodiment of the present invention, the woven fabric has a static air permeability (SAP) of 3 l/dm$^2$/min or lower when the fabric is unaged, a dynamic air permeability (DAP) of 500 mm/s or lower when the fabric is unaged and a tensile strength of the fabric in both the warp and weft directions of 1000 N or greater when the fabric is unaged.

In one nonlimiting embodiment, the basis weight of the fabric is in the range from about 50 to about 500 g/m$^2$.

In one nonlimiting embodiment, the tear strength of the fabric in both the warp and weft directions is 60 N or greater when the fabric is unaged. In another nonlimiting embodiment, the tear strength of the fabric in both the warp and weft directions is 120 N or greater when the fabric is unaged.

In one nonlimiting embodiment, the edgecomb resistance of the fabric in both the warp and weft directions is 150 N or greater when the fabric is unaged. In another nonlimiting embodiment, the edgecomb resistance of the fabric in both the warp and weft directions is 175 N or greater when the fabric is unaged.

The fabrics disclosed herein may be coated to provide additional properties, including, for example, a reduction in air permeability. If the fabrics are coated, then any coating, web, net, laminate or film known to those skilled in the art may be used in impart a decrease in air permeability or improvement in thermal resistance. Examples of suitable coating include, but are not limited to polychloroprene, silicone based coatings, polydimethylenesiloxane, polyurethane and rubber compositions. Examples of suitable webs, nets and films include but are not limited to polyurethane, polyacrylate, polyamide, polyester, polyolefins, polyolefin elastomers and blends and copolymers thereof. Films may be single or multilayer and may be comprised of any combination of webs, nets or films. In these embodiments, fabric of the current invention may be used as a lower permeability substrate than fabrics with the same construction coated with a conventional amount of coating, film or laminate. This will allow for a lower weight coating, or a lighter or simplified web, net, laminate or film structure to be applied, and still meet very low permeability specifications.

Also provided in the present invention are methods for forming the uncoated woven fabrics. In these methods, yarn formed from synthetic fibers is woven in the warp direction and weft direction to form a fabric with a top surface and a bottom surface. The fabric is then treated in order to permanently modify the cross-section and fuse at least a portion of the fibers in the yarn on the top surface or at least a portion of the fibers in the yarn on the bottom surface. In one nonlimiting embodiment, the fabric is treated to permanently modify the cross-section and fuse at least a portion of the fibers in the yarn on the top surface and at least a portion of the fibers in the yarn on the bottom surface. In another nonlimiting embodiment the fabric is treated in order to permanently modify the cross-section and fuse at least a majority of the fibers in the yarn on the top surface or at a majority of the fibers in the yarn on the bottom surface. In yet another nonlimiting embodiment of the current invention, the fabric is treated to permanently modify the cross-section and fuse at a majority of the fibers in the yarn on the top surface and at a majority of the fibers in the yarn on the bottom surface. The method may also comprise other processing steps understood by those skilled in the art of fabric processing. These include, but are not limited to scouring or washing and drying or heat setting.

In one nonlimiting embodiment, the fabric is washed prior to being treated in order to permanently modify the cross-section and fuse at least a portion of the fibers in the yarn on the top surface or at least a portion of the fibers in the yarn on the bottom surface. In another nonlimiting embodiment, the fabric is unwashed prior to being treated in order to permanently modify the cross-section and fuse at least a portion of the fibers in the yarn on the top surface or at least a portion of the fibers in the yarn on the bottom surface.

In one nonlimiting embodiment of the present invention, the fabric formed from the method has a static air permeability (SAP) of 3 l/dm$^2$/min or lower when the fabric is unaged, a dynamic air permeability (DAP) of 500 mm/s or lower when the fabric is unaged, and the tensile strength of the fabric in both the warp and weft directions is 1000 N or greater when the fabric is unaged.

In one nonlimiting embodiment, the fabric is treated by High Temperature-High Pressure (HTHP) treatment of the fabric at a temperature sufficient to permanently modify the cross-section and fuse at least a portion of the fibers in the yarn. In nonlimiting embodiments, the temperature used is above the softening temperature of the yarn. In a nonlimiting embodiment, fabrics formed from nylon 6,6 yarn may be HTHP treated at temperatures at range from about 220° C. to about 240° C. In another nonlimiting embodiment, fabrics formed from PET yarn may be HTHP treated at temperatures at range from about 200° C. to about 240° C. In a nonlimiting embodiment, the fabrics may be HTHP treated at high pressures ranging from about 28 Mpa to about 115 MPa. The pressure is calculated from the total applied force on the area of fabric at the calender nip point. In one nonlimiting embodiment, the fabrics are HTHP treated at a pressure of about 57 MPa. In a nonlimiting embodiment, the fabrics may be HTHP treated for a duration ranging from about 3 m/min to about 50 m/min. In one nonlimiting embodiment, the fabrics are HTHP treated for a duration of 15 m/min. In another nonlimiting embodiment, the fabrics are HTHP treated for a duration of 5 m/min. The fabrics may be HTHP treated by any method known in the art to apply temperatures and pressures necessary to permanently modify the cross-section and fuse at least a portion of the fibers in the yarn. In one nonlimiting embodiment, the HTHP treatment comprises hot roll calendering the fabric.

In one nonlimiting embodiment, the method further comprises applying a coating, or film to the fabric to further decrease air permeability. If the fabrics are coated any coating, web, net, laminate or film known to those skilled in the art may be used in impart a decrease in air permeability. Examples of suitable coating include, but are not limited to polychloroprene, silicone based coatings, polydimethylenesiloxane, polyurethane and rubber compositions. Examples of suitable webs, nets and films include but are not limited to polyurethane, polyacrylate, polyamide, polyester, polyolefins, polyolefin elastomers and blends and copolymers thereof. Films may be single or multilayer and may be comprised of any combination of webs, nets or films. In these embodiments, fabric of the current invention may be used as a lower permeability substrate than fabrics with the same construction coated with the conventional amount of coating, film or laminate. This will allow for a lower weight coating, or a lighter or simplified web, net, laminate or film structure to be applied, and still meet very low permeability specifications.

Fabrics of the present invention produced in accordance with these methods meet mechanical and performance standards while limiting overall fabric weight and cost. Further, the fabrics of the present invention retain good packability.

Also provided in the present invention are articles formed from the woven fabrics and methods for their production disclosed herein. In one nonlimiting embodiment of the present invention, the fabric is used to produce a product such as an automobile airbag, a sailcloth, inflatable slides, temporary shelters, tents, ducts, coverings and printed media. The term airbags, as used herein, includes airbag cushions. Airbag cushions are typically formed from multiple panels of fabrics and can be rapidly inflated. Fabric of the present invention can be used in airbags sewn from multiple pieces of fabric or from a one piece woven (OPW) fabric. One Piece Woven (OPW) fabric can be made from any method known to those skilled in the art. The OPW fabric shown in FIGS. 7A-7F were woven using a jacquard such that sections of fabric were formed into a continuous seam, and other sections of fabric were formed into single sheets in order to provide a plurality of interconnected chambers. As shown in FIGS. 7A-7F and Samples 1 and 2 of Table 4, fabrics of the present invention may be HTHP treated to produce an OPW airbag with the reduced permeability benefits needed for airbag applications.

As will be understood by the skilled artisan upon reading this disclosure, alternative methods and apparatus to those exemplified herein that result in at least a portion of the yarn on the top surface or at least a portion of the yarn on the bottom surface permanently modified cross-section fibers and that are fused together are available, and use thereof is encompassed by the present invention.

All patents, patent applications, test procedures, priority documents, articles, publications, manuals, and other documents cited herein are fully incorporated by reference to the extent such disclosure is not inconsistent with this invention and for all jurisdictions in which such incorporation is permitted.

EXAMPLES

The following Examples demonstrate the present invention and its capability for use. The invention is capable of other and different embodiments, and its several details are capable of modifications in various apparent respects, without departing from the scope and spirit of the present invention. Accordingly, the Examples are to be regarded as illustrative in nature and non-limiting.

Test Methods

All of the test standards & methods are to ASTM or ISO methods with specific amendments.

The Dynamic Air Permeability (DAP or ADAP) is defined as the average velocity (mm/s) of air or gas in the selected test pressure range of 30-70 kPa, converted to a pressure of 100 kPa (14.2 psi) and a temperature of 20° C. Another parameter, the curve exponent E (of the air permeability curve), is also measured automatically during Dynamic Air Permeability testing but this has no units. Dynamic Air Permeability is tested according to test standard ASTM D6476 but with the following amendments:

1. The limits of the measured pressure range (as set on the test instrument) are 30-70 kPa
2. The start pressure (as set on the test instrument) is to be adjusted to achieve a peak pressure of 100+/−5 kPa.
3. The test head volume will be 400 $cm^3$ unless the specified start pressure cannot be achieved with this head, in which case one of the other interchangeable test heads (volumes 100, 200, 800 & 1600 $cm^3$) should be used as is found to be appropriate for the fabric under test.
4. Dynamic Air Permeability testing will be done at six sites on a test fabric in a sampling pattern across and along the fabric in order to test 6 separate areas of warp and weft threadlines within the fabric.
5. The reported Dynamic Air Permeability result is the mean value of the six DAP measurements in units of mm/second.
6. The reported curve exponent (E) result is the mean value of the six curve exponent measurements (no units apply).

The Static Air Permeability (SAP—in units of l/dm²/min) is tested according to test standard ISO 9237 but with the amendments as listed below:

1. The test area is 100 cm$^2$
2. The test pressure (partial vacuum) is 500 Pa.
3. Each individual test value is corrected for edge leakage.
4. Static Air Permeability testing will be done at six sites on a test fabric in a sampling pattern across and along the fabric in order to test 6 separate areas of warp and weft threadlines within the fabric.
5. The reported Static Air Permeability result is the mean value of the six corrected measurements in units of l/dm$^2$/min The Heat Aging of the fabric was conducted according to test standard ASTM D5427 but with the amendments as listed below:
1. The duration of ageing is 408 hours
2. The ageing temperature is 105+/−2° C.
3. Following heat ageing the aged specimens are re-conditioned according to standard ISO 139 for >/=24 hours at a temperature of 20+/−2° C. and relative humidity of 65+/−4% before testing.

The Humidity Aging of the fabric was conducted according to EASC 9904 0180 section 5.01.03 which specifies test standard ASTM D5427 but with EASC amendments as listed below:
1. The duration of ageing is 408 hours
2. The ageing temperature is 70+/−2° C.
3. The ageing relative humidity is 95+/−2%
4. Following humidity ageing the aged specimens are re-conditioned according to standard ISO 139 for >/=24 hours at a temperature of 20+/−2° C. and relative humidity of 65+/−4% before testing.

Fabric tensile testing, measuring both maximum force (N) & elongation at maximum force (%), is tested according to standard ISO 13934-1 but with the amendments as listed below:
1. The initial gauge (clamp) length set on the Instron tensile tester is 200 mm
2. The Instron crosshead speed is set at 200 mm/min
3. Fabric specimens are cut initially to size 350×60 mm but are then frayed down by unraveling the long edge threadlines to a testing width of 50 mm.
4. Tensile testing is done on 5 warp direction & 5 weft direction specimens cut from each test fabric in a diagonal cross pattern & avoiding any areas within 200 mm of the fabric selvedges.
5. The reported result for maximum force (also known as breaking force or breaking load) is the average of the maximum force results of the five warp direction specimens & (separately) the five weft direction specimens which were tested in Newtons (N).
6. The reported result for elongation at maximum force (also known as percentage elongation or percentage extension) is the average of the elongation at maximum force results of the five warp direction specimens & (separately) the five weft direction specimens which were tested (%).

Tear force (also known as tear strength)—in Newtons (N) is tested according to standard ISO 13937-2 but with the amendments as listed below:
1. The fabric specimen size is 150 mm×200 mm (with a 100 mm slit extending from the midpoint of the narrow end to the center.
2. Tear testing is done on 5 warp direction & 5 weft direction specimens cut from each test fabric in a diagonal cross pattern & avoiding any areas within 200 mm of the fabric selvedges.
3. Warp direction tear results are obtained from tested specimens where the tear is made across the warp (i.e. warp threadlines are torn) whilst weft direction results are obtained from tested specimens where the tear is made across the weft (i.e. weft threadlines are torn).
4. Each leg of the specimens is to be folded in half to be secured in the Instron clamp grips according to ISO 13937-2 annex D/D.2
5. Evaluation of test results is according to ISO 13937-2 section 102 "Calculation using electronic devices".

The reported result for warp tear force is the average of the tear force results of the five warp direction specimens in Newtons (N), whilst for weft tear force it is the average of the tear force results of the five weft direction specimens.

Edgecomb resistance testing (also known as edge pullout testing)—in Newtons (N) is tested according to standard ASTM D6479 but with the amendments as listed below:
1. The edge distance shall be 5 mm—this is the distance between the end of the test specimen (which during testing is positioned on a narrow ledge machined in the test specimen holder) & the line of pins which perform the "pullout", ie this is the length of the section of threadlines pulled out during the test.
2. Edgecomb resistance testing is done on 5 warp direction & 5 weft direction specimens cut from each test fabric in a diagonal cross pattern & avoiding any areas within 200 mm of the fabric selvedges.

The warp direction edgecomb resistance results are obtained from tested specimens where warp threadlines are being pulled out, whilst weft direction results are obtained from tested specimens where the weft threadlines are being pulled out.

The reported result for warp edgecomb resistance is the average of the edgecomb resistance results of the five warp direction specimens in Newtons (N), whilst for weft edgecomb resistance it is the average of the results of the five weft direction specimens.

Stiffness (Stiffness of fabric by the circular bend procedure)—in Newtons (N) is tested using a J. A. King pneumatic stiffness tester according to standard ASTM D4032 but with the amendments as listed below:
1. The plunger stroke speed is 2000 mm/min
2. Stiffness testing is done on 5 warp direction & 5 weft direction specimens cut from each test fabric in a diagonal cross pattern & avoiding any areas within 200 mm of the fabric selvedges.
3. Each 200×100 mm specimen is single folded across the narrow dimension before being placed on the instrument testing platform for testing
4. The reported result (in Newtons) for warp stiffness is the average of the stiffness results of the five warp direction specimens whilst the result for weft stiffness is the average of the five weft direction specimens.

The Warp direction stiffness results are obtained from tested specimens where the longest dimension (200 mm) is parallel to the fabric warp direction, whilst weft direction results are obtained from tested specimens where the longest dimension (200 mm) is parallel to the fabric weft direction.

Example 1

100% nylon 6,6, fabrics were woven in the warp direction and weft direction. The woven fabrics were then treated as follows: 57 MPa pressure via a calender nip roll with force 400 N/mm of fabric width, 220-230° C., at 5 m/min process speed. Fabrics in table 1 were treated on either the top or bottom surface by passing once through a calendering machine with heated roll.

Figure 1:
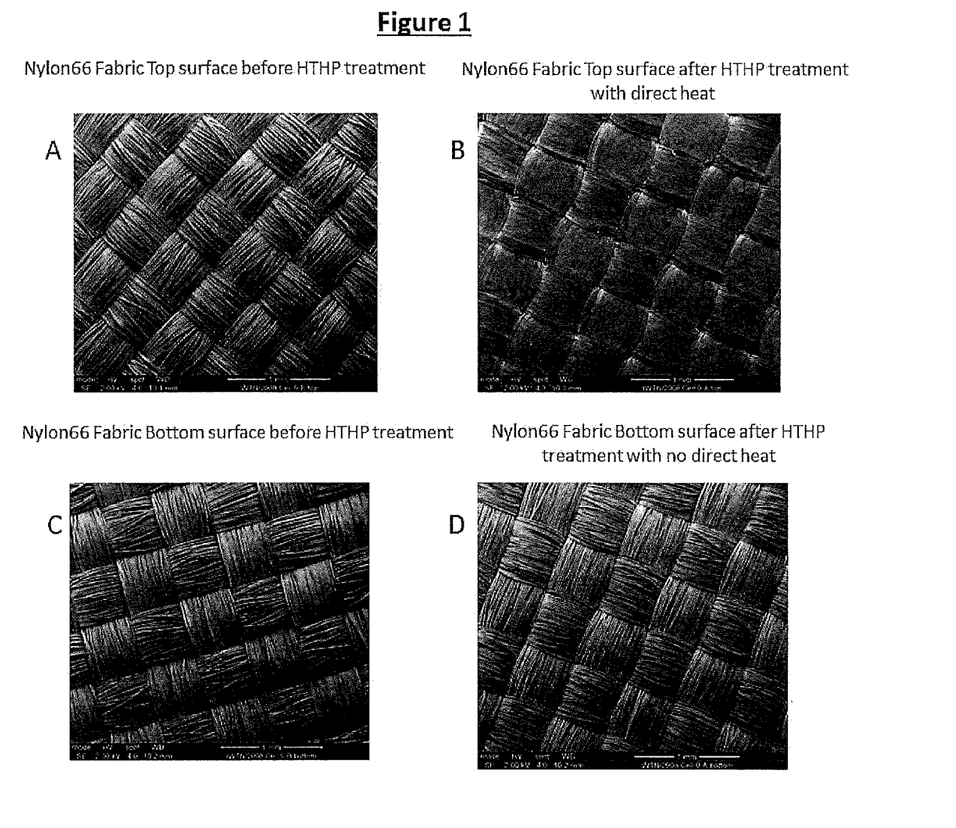
FIGS. 1A through 1D are SEM images at ca 15× magnification comparing the top (FIG. 1A) and bottom surfaces (FIG. 1C) of a 100% nylon 66 fabric made from 470 dtex, 136 filament, high tenacity fiber as compared to a fabric of the present invention high temperature-high pressure (HTHP) treated with a heated roll top surface (FIG. 1B) and a non-heated roll bottom surface (FIG. 1D). The number of filaments within the fiber is not limited to 136, but is limited within the range equating to about 1 to about 25 linear decitex per filament.
Figure 2:
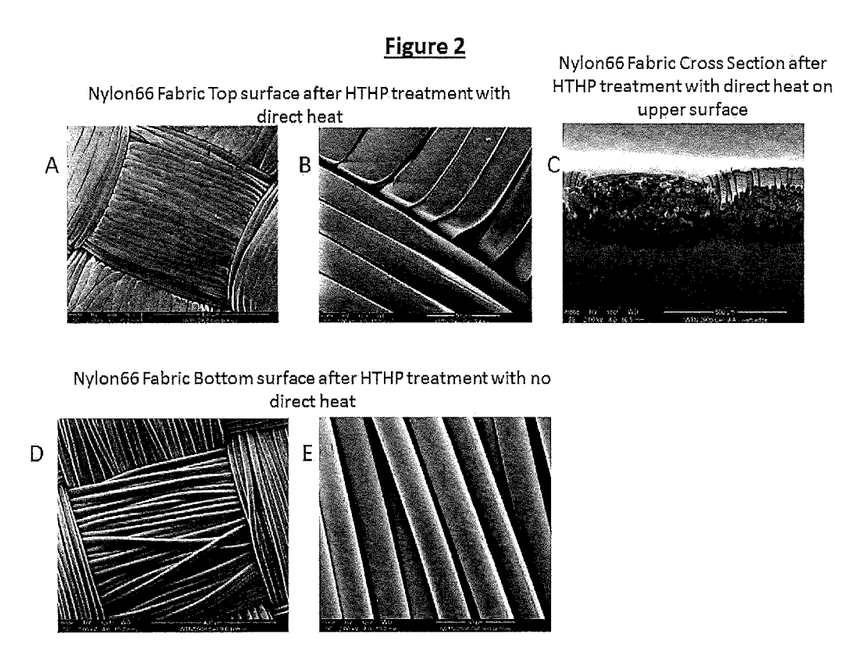
FIGS. 2A through 2E are SEM images showing the directly heated top surface of a fabric of the present invention at ca 40× magnification (FIG. 2A) and ca 200× magnification (FIG. 2B) and the calendered non-heated bottom surface of a fabric of the present invention at ca 40× magnification (FIG. 2D) and at ca 200× magnification (FIG. 2E) as well as a cross-sectional view of the fabric of the present invention at ca 35× magnification (FIG. 2C).
Figure 3:
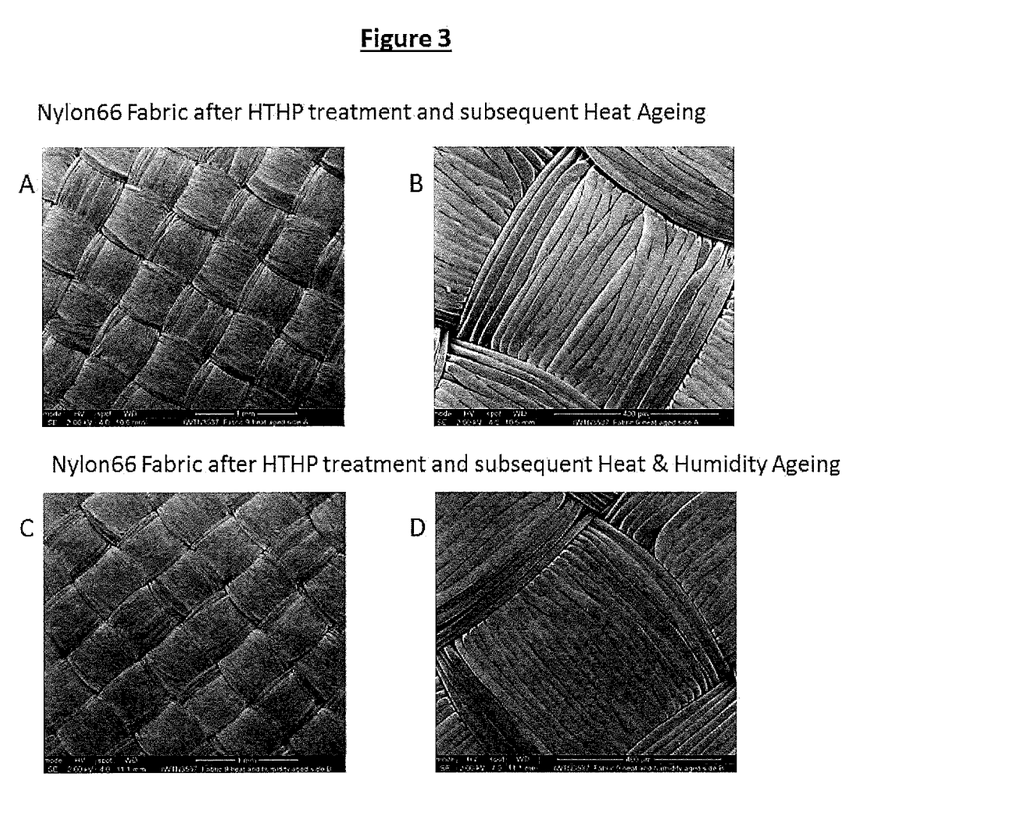
FIGS. 3A through 3D are SEM images of a heat aged fabric of the present invention at ca 15× magnification (FIG. 3A) and at ca 45× magnification (FIG. 3B) and a heat and humidity aged fabric of the present invention at ca 15× magnification (FIG. 3C) and at ca 45× magnification (FIG. 3D).
Figure 4:
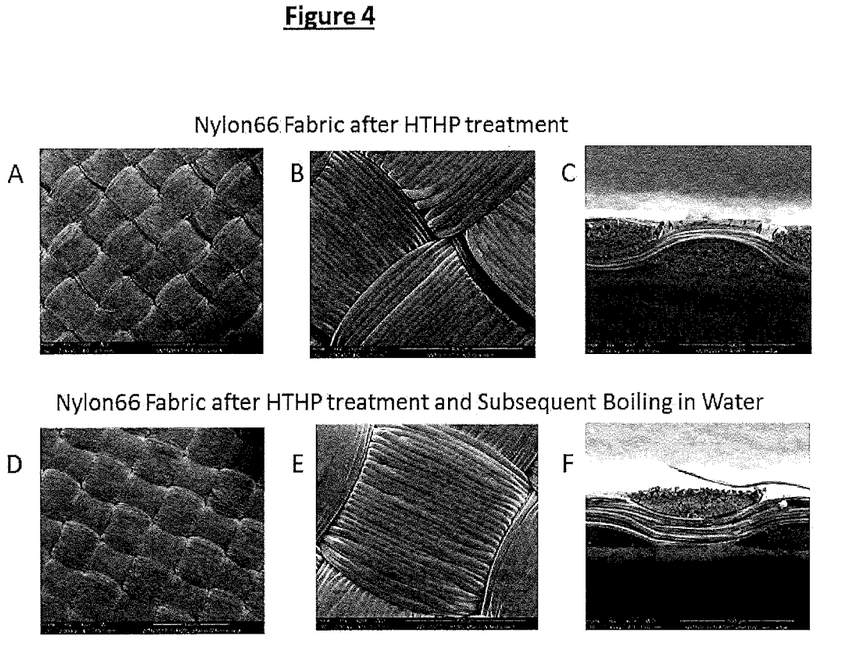
FIGS. 4A through 4F are SEM images of fabrics of the present invention after soaking and stirring in boiling water for 10 minutes followed by drying and conditioning for 24 hours at ca 10× magnification (FIG. 4D) and at ca 40× magnification (FIG. 4E) as well as a cross-sectional view at ca 30× magnification (FIG. 4F) as compared to untreated fabric of the present invention at ca 10× magnification (FIG. 4A), at ca 40× magnification (FIG. 4B) and a cross-sectional view at ca 30× magnification (FIG. 4C).
Figure 5:
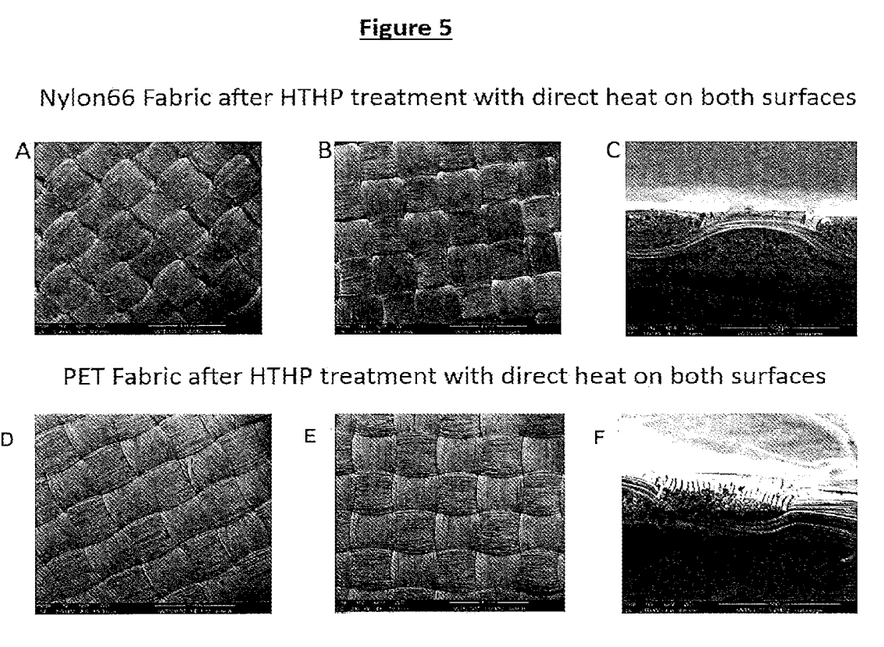
FIGS. 5A through 5F are SEM images of two different embodiments of fabrics of the present invention HTHP treated on both the top side and bottom side with a heated surface roll. SEM images at ca 10× magnification of the top and bottom and at ca 30× magnification cross-sectional view of a fabric of the present invention prepared from nylon 6,6 470 dtex, 136 filament, high tenacity fiber are depicted in FIGS. 5A, 5B and 5C, respectively. SEM images at ca 10× magnification of the top and bottom and at ca 30× magnification cross-sectional view of a fabric of the present invention prepared from polyethylene terephthalate (PET) fabric made from 470 dtex, 140 filament, high tenacity fibers are depicted in FIGS. 5D, 5E and 5F, respectively.
Figure 6:
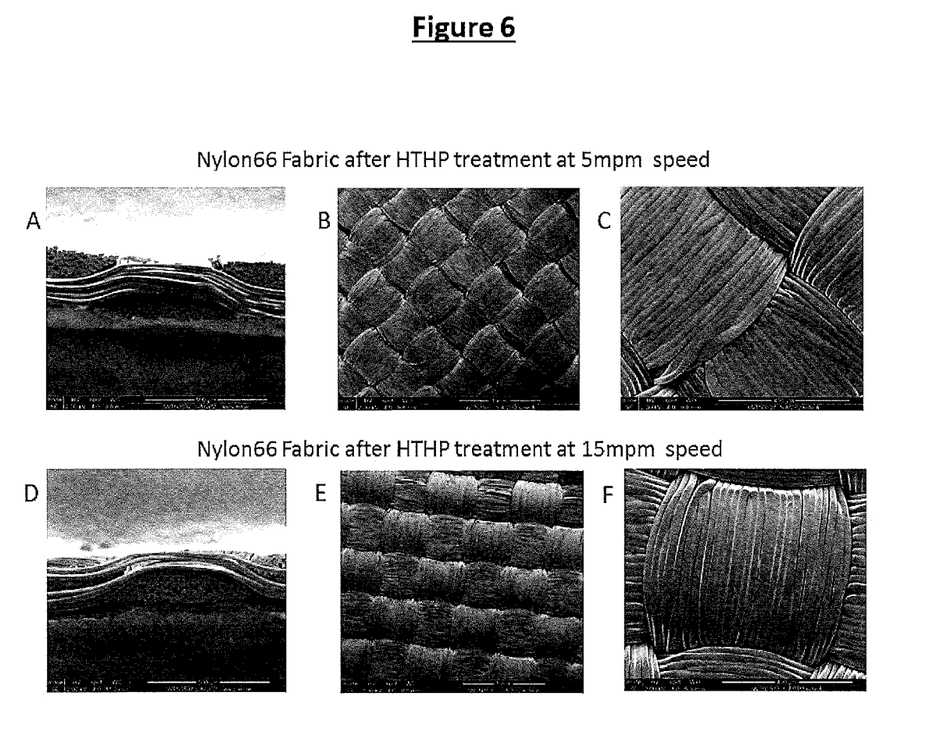
FIGS. 6A through 6F are SEM images comparing the effect of HTHP treatment process speed at 5 m/min (see FIG. 6A at ca 30× magnification, 6B at ca 10× magnification and 6C at ca 40× magnification) versus 15 m/min (see FIGS. 6D, 6E and 6F at respectively equivalent magnifications) on permeability and surface structure of a fabric of 100% nylon 66 fabric made from 470 dtex 136 filament high tenacity fiber of the present invention.
Figure 7:
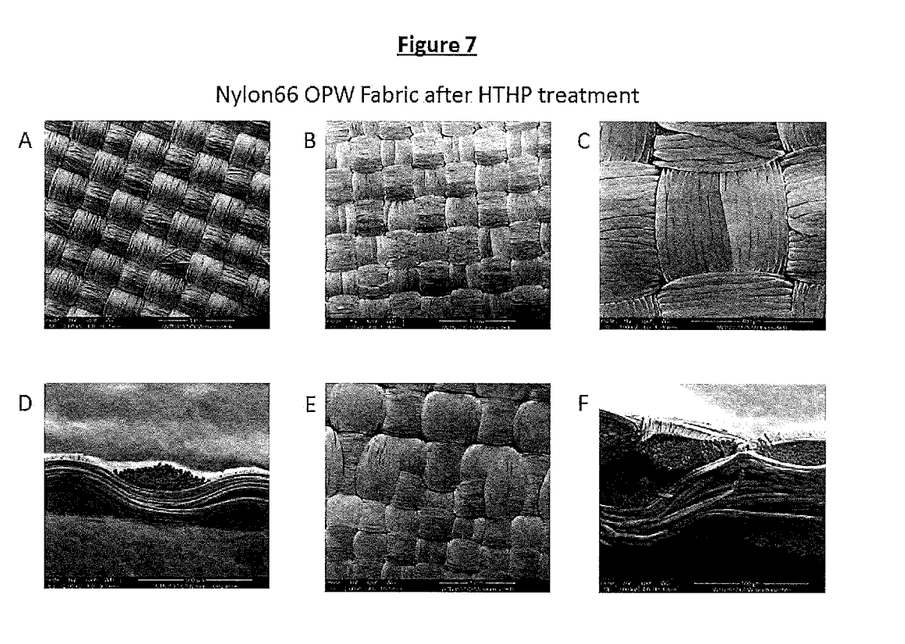
FIG. 7A is a ca 10× magnification image of the inside of the double layer section of the OPW airbag.
FIG. 7B is a ca 10× magnification image of the top outer surface of the OPW airbag and has been in contact with direct heat.
FIG. 7C is ca 40× magnification surface image.
FIG. 7D is a ca 30× magnification image of a cross section where the lower surface has been in contact with the direct heat and the upper surface has only been compressed.
FIG. 7E is a ca 10× magnification image of the OPW fabric surface at the double fabric layer at the seam.
FIG. 7F is a ca 30× magnification image of the cross section at the double seam layer where the upper and lower surfaces have been in contact with direct heat.

Table 1 shows data for fabrics formed from yarn produced from Nylon 66 polymer fiber with the following properties: 470 decitex, 136 Filament and 81 cN/tex tenacity in a 19×18 construction that was washed and HTHP processed via hot roll calendering on one side. The non HTHP treated equivalent fabric is shown in comparison. SEM images of these fabrics are shown in FIGS. 1-3.

formed from 470 Dtex, 136 filament yarn and 3 DPF fiber were woven in the warp direction and weft direction. The woven fabrics were then treated as follows: 57 MPa pressure via a calender nip roll with force 400 N/mm of fabric width, 220-230° C., at 5 m/min or 15 m/min process speed. Fabrics treated on either the top or bottom surface were passed once through a calendering machine with heated roll. Fabrics

TABLE 1

| Test detail | Nylon 66 470F136 Fabric non HTHP treated | | | Nylon 66 470F136 Fabric HTHP treated | | |
| --- | --- | --- | --- | --- | --- | --- |
| | Unaged | Heat aged | Humidity aged | Unaged | Heat aged | Humidity aged |
| Fabric weight (g/m$^2$) | 195.8 | 196.2 | 197.0 | 199.3 | 200.9 | 204.3 |
| Construction (ends/dm) warp × weft | 190 × 180 | 189.8 × 180.6 | 190.4 × 180.8 | 193.6 × 180.4 | 194.2 × 180.6 | 195.0 × 183.2 |
| Fabric thickness (mm) | 0.297 | 0.297 | 0.297 | 0.237 | 0.237 | 0.240 |
| Warp tensile test breaking force (N) | 2816.4 | 2819.4 | 2852.4 | 2879.0 | 2783.2 | 2900.4 |
| Weft tensile test breaking force (N) | 2716.0 | 2682.2 | 2669.0 | 2580.0 | 2491.4 | 2611.8 |
| Warp tensile test extension to break (%) | 35.1 | 32.8 | 34.1 | 33.4 | 32.9 | 35.0 |
| Weft tensile test extension to break (%) | 39.8 | 35.6 | 33.9 | 35.5 | 34.7 | 37.9 |
| Warp tear strength (N) | 142.5 | 127.0 | 130.1 | 144.7 | 136.2 | 140.7 |
| Weft tear strength (N) | 158.3 | 133.9 | 135.7 | 142.3 | 131.6 | 136.7 |
| Warp edgecomb resistance (N) | 245.3 | 310.4 | 303.7 | 293.2 | 324.5 | 367.2 |
| Weft edgecomb resistance (N) | 242.1 | 282.1 | 331.1 | 299.8 | 327.6 | 345.3 |
| Static air permeability (corrected) at 500 Pa (L/dm$^2$/min) | 29.20 | 36.94 | 32.61 | 1.82 | 2.44 | 1.94 |
| Dynamic air permeability (mm/s) | 1650 | 1735 | 1752 | 452.7 | 472.5 | 468.5 |
| Dynamic air permeability curve exponent | 0.96 | 0.942 | 0.963 | 1.23 | 1.20 | 1.23 |

FIGS. 1A through 1D are SEM images at ca 15× magnification comparing the top (FIG. 1A) and bottom surfaces (FIG. 1C) of a 100% nylon 66 fabric made from 470 dtex, 136 filament, high tenacity fiber as compared to a fabric of the present invention high temperature-high pressure (HTHP) treated with a heated roll top surface (FIG. 1B) and a non-heated roll bottom surface (FIG. 1D). As shown by these SEM images, in the present invention, the HTHP treated fabric side in contact with the heated roll during calendering has fibers with a permanently modified cross-section and partially fused surface filaments resulting in reduced permeability while the unheated side is compressed but the yarns are not fused.

FIGS. 2A through 2E are SEM images showing the directly heated top surface of a fabric of the present invention at ca 40× magnification (FIG. 2A) and ca 200× magnification (FIG. 2B) and the calendered non-heated bottom surface of a fabric of the present invention at ca 40× magnification (FIG. 2D) and at ca 200× magnification (FIG. 2E) as well as a cross-sectional view of the fabric of the present invention at ca 35× magnification (FIG. 2C). As shown by these SEM images, only the outer filaments subject to direct heat are fused and have a permanently modified cross-section. The inner filaments are still round and retain their strength properties. These characteristics results in a fabric with reduced permeability coupled with retention of airbag standard tensile properties.

FIGS. 3A through 3D are SEM images of a heat aged fabric of the present invention at ca 15× magnification (FIG. 3A) and at ca 45× magnification (FIG. 3B) and a heat and humidity aged fabric of the present invention at ca 15× magnification (FIG. 3C) and at ca 45× magnification (FIG. 3D). As shown by these SEM images, the surface filaments have a permanently modified cross-section and partial fusing is permanent, thus resulting in a permanent reduction in permeability of the fabric.

Example 2

A trial was conducted with both fabrics formed from Nylon 6,6 and PET yarns. The 100% nylon 6,6 fabrics were then passed through the calendering machine with heated roll for a second time for treatment of both surfaces. The 100% PET fabrics formed from 470 Dtex, 140 filament yarn and 3 DPF fiber were woven in the warp direction and weft direction. The woven fabrics were then treated as follows: 57 MPa pressure via a calender nip roll with force 400 N/mm of fabric width, 200-220° C., at 5 m/min or 15 m/min. Fabrics treated on either the top or bottom surface were passed once through a calendering machine with heated roll. Fabrics were passed through the calendering machine with heated roll for a second time for treatment of both surfaces. The Nylon and PET fabrics were also tested for the effects of heat aging and humidity aging, and the Nylon for boiling as well.

FIGS. 4A through 4F are SEM images of fabrics of the present invention after soaking and stirring in boiling water for 10 minutes followed by drying and conditioning for 24 hours at ca 10× magnification (FIG. 4D) and at ca 40× magnification (FIG. 4E) as well as a cross-sectional view at ca 30× magnification (FIG. 4F) as compared to untreated fabric of the present invention at ca 10× magnification (FIG. 4A), at ca 40× magnification (FIG. 4B) and a cross-sectional view at ca 30× magnification (FIG. 4C). As shown by these SEM images, the permanently modified cross-section and partial fusion of the fibers is unchanged after water boiling and remains permanent.

FIGS. 5A through 5F are SEM images of two different embodiments of fabrics of the present invention HTHP treated on both the top side and bottom side with a heated surface roll. SEM images at ca 10× magnification of the top and bottom and at ca 30× magnification cross-sectional view of a fabric of the present invention prepared from nylon 6,6 470 dtex, 136 filament, high tenacity fiber are depicted in FIGS. 5A, 5B and 5C, respectively. As shown by these SEM images, fibers on both sides of the nylon 6,6 fabric had a permanently modified cross-section and were partially fused while the inner filaments were compressed together but substantially undeformed. This fabric exhibited a very low static air permeability (SAP). SEM images at ca 10× magnification of the top and bottom and at ca 30× magnification cross-sectional view of a fabric of the present invention prepared from polyethylene terephthalate (PET) fabric made from 470 dtex, 140 filament, high tenacity fibers are depicted in FIGS. 5D, 5E and 5F, respectively. As shown by these SEM images, fibers on both sides of the PET fabric also exhibited modification of the cross-section and fusing of a portion of the yarns while the inner filaments were compressed but undeformed.

FIGS. 6A through 6F are SEM images comparing the effect of HTHP treatment process speed at 5 m/min (see FIG. 6A at ca 30× magnification, 6B at ca 10× magnification and 6C at ca 40× magnification) versus 15 m/min (see FIGS. 6D, 6E and 6F at respectively equivalent magnifications) on the surface structure of a fabric of 100% nylon 66 fabric made from 470 dtex 136 filament high tenacity fiber of the present invention. While fabric permeability was higher at the higher processing speed, the surface and cross-sectional structures was very similar.

FIGS. 7A through 7F are SEM images showing the effects of HTHP treatment of an OPW fabric. The fabric was prepared from a nylon 6,6 350 dtx, 136 fil, high tenacity fiber. The OPW fabric was HTHP treated on both sides. FIG. 7A is a ca 10× magnification image of the inside of the double layer section of the OPW airbag. Although it has been compressed it has not been in contact with the direct heat, and so does not show cross-section modification and partially fused filaments. FIG. 7B is a ca 10× magnification image of the top outer surface of the OPW airbag and has been in contact with direct heat and so the surface filaments have a permanently modified cross-section and are partially fused together. FIG. 7C is ca 40× magnification image demonstrating a permanently modified cross-section and partially fused filaments. FIG. 7D is a ca 30× magnification image of a cross section where the lower surface has been in contact with the direct heat and the upper surface has only been compressed. FIG. 7E is a ca 10× magnification image of the OPW fabric surface at the double fabric layer at the seam. The surface filaments at the seam have a permanently modified cross-section and are partially fused. FIG. 7F is a ca 30× magnification image of the cross section at the double seam layer where the upper and lower surfaces have been in contact with direct heat, and so have a permanently modified cross-section and partially fused filaments, whilst the inner filaments are compressed but undeformed.

Table 2 summarizes the data for PET fabric during the trial. Sample 1 is non-HTHP treated control PET fabric made from 470 Dtex, 140 filament, high tenacity (approximately 73 cN/tex) fiber and PET polymer (fibers with such properties typically require polymer with intrinsic viscosity IV>0.87). The fabric has a construction of 18.4×18.6 and was woven in a water jet loom. Sample 2 is the fabric from sample 1 that was calendered with HTHP treatment on both sides at 5 m/min Sample 3 shows representative properties of a typical medium weight uncoated commercially available PET airbag fabric. Sample 4 shows representative properties of a typical medium weight, coated, commercially available PET airbag fabric.

TABLE 2

| Sample | SAP (L/dm2/min) | DAP (mm/s) | Construction (threads/cm) | Weight (g/m2) | Warp Tensile (N/50 mm) | Weft Tensile (N/50 mm) | Tear Strength (N) | Edgecomb (N) | Stiffness (N) |
|---|---|---|---|---|---|---|---|---|---|
| 1 | 13.1 | 922 | 18.5 | 181 | 3006 | 2784 | 163 | 257 | 4.7 |
| 2 | 1.1 | 145 | 18.9 | 188 | 3002 | 2814 | 163 | 282 | 5.0 |
| 3 | 5.0 | 600 | 22.0 | 225 | 2800 | 2800 | 80 | 600 | 20.0 |
| 4 | 0.0 | 0 | 22.0 | 250 | 2800 | 2800 | 120 | 500 | 20.0 |

Table 3 summarizes the data for Nylon 66 fabric during the trial, fabrics with such properties typically require polymer with relative viscosity RV>70. Sample 1 is a non-HTHP treated Control Nylon 66 fabric made from 470 Dtex, 136 filament, high tenacity (approximately 81 cN/tex) fiber, that was unwashed and woven in a 19×19 construction. Sample 2 is the fabric from sample 1 that was HTHP treated on both sides by calendering at a speed of 5 m/min and 221° C. Sample 3 is the fabric from sample 1 that was calendered with the same conditions as Sample 2 but at a speed of 15 m/min Sample 4 shows representative properties of a typical light weight, 470 dtex, and coated commercially available airbag fabric. Sample 5 shows representative properties of a typical heavy weight, 470 dtex, and coated commercially available airbag fabric. Sample 6 shows representative properties of a typical medium weight, 470 dtex, and uncoated commercially available airbag fabric. Sample 7 shows representative properties of a typical heavy weight, 470 dtex and uncoated commercially available airbag fabric.

TABLE 3

| Sample | SAP (L/dm2/min) | DAP (mm/s) | Construction (threads/cm) | Weight (g/m2) | Warp Tensile (N/50 mm) | Weft Tensile (N/50 mm) | Tear Strength (N) | Edgecomb (N) | Stiffness (N) |
|---|---|---|---|---|---|---|---|---|---|
| 1 | 5.0 | 660 | 18.8 | 194 | 3357 | 3212 | 193 | 208 | 6.0 |
| 2 | 0.1 | 76 | 19.0 | 198 | 3227 | 3089 | 193 | 296 | 10.0 |
| 3 | 0.4 | 141 | 19.0 | 197 | 3298 | 3094 | 192 | 251 | 10.8 |
| 4 | 0.1 | 0 | 18.0 | 210 | 3100 | 3100 | 300 | 300 | 5.0 |
| 5 | 0.1 | 0 | 19.7 | 230 | 3300 | 3300 | 280 | 310 | 14.0 |

TABLE 3-continued

| Sample | SAP (L/dm2/min) | DAP (mm/s) | Construction (threads/cm) | Weight (g/m2) | Warp Tensile (N/50 mm) | Weft Tensile (N/50 mm) | Tear Strength (N) | Edgecomb (N) | Stiffness (N) |
|---|---|---|---|---|---|---|---|---|---|
| 6 | 3.2 | 563 | 19.5 | 205 | 3450 | 3510 | 175 | 350 | 13.0 |
| 7 | 3.7 | 390 | 22.5 × 21 | 244 | 3350 | 3210 | 155 | 720 | 25.0 |

Table 4 displays results for an OPW fabric. Sample 1 is an example of a non-HTHP treated OPW fabric woven from 350 dtx, 3 dpf Nylon 6,6 yarn. Sample 2 is the OPW fabric from sample 1 that was HTHP treated on one side by calendering at 5 mpm, 225° C., and 57 MPa pressure via a calender nip roll with force 400 N/mm of fabric width. As shown in Table 4, the fabric permeability has been significantly reduced and the physical properties are representative of typical airbag values.

TABLE 4

| Sample | SAP (L/dm2/min) | DAP (mm/s) | Construction (threads/cm) | Weight (g/m2) | Warp Tensile (N/50 mm) | Weft Tensile (N/50 mm) | Tear Strength (N) | Edgecomb (N) | Stiffness (N) |
|---|---|---|---|---|---|---|---|---|---|
| 1 | 2.6 | 481 | 24.4 | 199 | 2370 | 2739 | 91 | 750 | 8.4 |
| 2 | 0.27 | 209 | 24.5 | 196 | 2342 | 2554 | 83 | 723 | 9.9 |

Table 5 summarizes the permeability results of Nylon 66 & PET fabrics after 408 hours heat aging and heat/humidity testing, the fabrics of the present invention retain very low air permeability values in comparison with the non HTHP treated starting fabrics. Sample 1 & 2 are the washed and unwashed versions of the same Nylon 66 fabric formed from 470 dtex, 136 filament yarn in a 20×19 construction, which was HTHP treated with direct heat on both sides. Sample 3 is a PET water jet woven fabric formed from 470 dtex, 140 filament yarn in a 18.5×18.5 construction, which was HTHP treated with direct heat on both sides.

TABLE 5

| | Unaged Results | | Heat Aged Results | | Heat & Humidity Aged Results | |
|---|---|---|---|---|---|---|
| Sample | SAP | DAP | SAP | DAP | SAP | DAP |
| 1 | 0.25 | 133 | 0.25 | 192 | 0.2 | 225 |
| 2 | 0.08 | 76 | 0.07 | 139 | 0.06 | 138 |
| 3 | 1.1 | 145 | 1.25 | 136 | 0.76 | 100 |

Table 6 shows the permeability results for the same fabric sample 2 after 6 months ageing at room temperature (20±5° C.), and after soaking and stirring in boiling water for 10 minutes followed by drying and conditioning for 24 hours. The low permeability results are retained, demonstrating the permanence of the permeability reduction as a result of the permanent change in fabric structure.

TABLE 6

| | Unaged Results | | After 6 months at room temperature | | After water boiling |
|---|---|---|---|---|---|
| Sample | SAP | DAP | SAP | DAP | SAP |
| 2 | 0.08 | 76 | 0.07 | 73.8 | 0.01 |

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also the individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±8%, or +10%, of the numerical value(s) being modified. In addition, the phrase "about 'x' to 'y'" includes "about to about 'y'". While the illustrative embodiments of the invention have been described with particularity, it will be understood that the invention is capable of other and different embodiments and that various other modifications will be apparent to and may be readily made by those skilled in the art without departing from the spirit and scope of the invention. Accordingly, it is not intended that the scope of the claims hereof be limited to the examples and descriptions set forth herein but rather that the claims be construed as encompassing all the features of patentable novelty which reside in the present disclosure, including all features which would be treated as equivalents thereof by those skilled in the art to which the invention pertains.

The invention claimed is:

1. An airbag fabric comprising:
   yarn formed from synthetic fibers, with at least a portion of the synthetic fibers on a surface of the yarn are fused while inner synthetic fibers of the yarn are undeformed, the synthetic fibers woven in a warp direction and a weft direction;
   wherein the fabric has a static air permeability (SAP) of 3 l/dm$^2$/min or lower;
   wherein the fabric has a dynamic air permeability (DAP) of 500 mm/s or lower; and
   wherein a tensile strength of the fabric in both the warp and weft directions is 1000 N or greater.

2. The airbag fabric of claim 1, wherein the fabric is uncoated.

3. The airbag fabric of claim 1, wherein the tensile strength of the fabric in both the warp and weft directions is 2000 N or greater.

4. The airbag fabric of claim 1, wherein the yarn has a linear density in the range from about 150 to about 750 decitex.

5. The airbag fabric of claim 1, wherein a basis weight of the fabric is in the range from about 50 to about 500 g/m$^2$.

6. The airbag fabric of claim 1, wherein a tear strength of the fabric in both the warp and weft directions is 60 N or greater.

7. The airbag fabric of claim 1, wherein an edgecomb resistance of the fabric in both the warp and weft directions is 150 N or greater.

8. The airbag fabric of claim 1, wherein the fibers have a linear density in the range from about 1 to about 25 decitex.

9. The airbag fabric of claim 1, wherein the fibers are formed from a polymer selected from the group consisting of polyamides, polyesters, polyolefins and blends or copolymers thereof.

10. The airbag fabric of claim 1, wherein the fabric has a dynamic air permeability (DAP) of 400 mm/s or lower.

11. The airbag fabric of claim 1, wherein all of the yarn used in the warp and weft directions is formed from a single polymer or a blend of polymers.

12. The airbag fabric of claim 1, wherein at least a portion of the fibers are substantially flat.

* * * * *